United States Patent

Young

[11] Patent Number: 6,110,242
[45] Date of Patent: Aug. 29, 2000

[54] APPARATUS FOR SEPARATING SOLIDS FROM A GAS

[75] Inventor: Michael J. Young, Cedarburg, Wis.

[73] Assignee: Blower Application Company, Inc., Germantown, Wis.

[21] Appl. No.: 09/170,548

[22] Filed: Oct. 13, 1998

[51] Int. Cl.[7] .................................................. B01D 45/12
[52] U.S. Cl. ........................... 55/337; 55/430; 209/139.2; 209/148; 406/173
[58] Field of Search .................................... 406/171, 173; 209/27, 29, 139.2, 137, 148, 250, 281; 55/428, 432, 430, 429, 460, 459.1, 459.2, 459.3, 451, 452, 454, 337

[56] References Cited

U.S. PATENT DOCUMENTS

| | | | |
|---|---|---|---|
| 997,185 | 7/1911 | Fasting | 209/250 |
| 1,666,475 | 4/1928 | Stebbins | 209/250 |
| 1,720,702 | 7/1929 | Streun | 55/430 |
| 1,910,829 | 5/1933 | Green . | |
| 2,136,506 | 11/1938 | Horn | 209/250 |
| 2,607,484 | 8/1952 | Whitfield | 406/173 |
| 2,643,734 | 6/1953 | Rowell | 209/250 |
| 3,017,993 | 1/1962 | MacPherson et al. | 209/250 |
| 3,113,733 | 12/1963 | Carlson | 209/250 |
| 3,116,238 | 12/1963 | Van Etten | 209/250 |
| 3,756,434 | 9/1973 | Teske | 222/55 |
| 3,909,222 | 9/1975 | Caughlin et al. | 55/432 |
| 4,156,600 | 5/1979 | Jacobsen | 55/430 |
| 4,274,786 | 6/1981 | Svensson et al. | 414/218 |
| 4,279,556 | 7/1981 | Ronning | 414/218 |
| 4,296,864 | 10/1981 | Misaka et al. | 209/148 |
| 4,382,857 | 5/1983 | Laughlin | 209/23 |
| 4,881,855 | 11/1989 | Rempel et al. | 406/53 |
| 4,881,862 | 11/1989 | Dick | 414/218 |
| 5,428,864 | 7/1995 | Pemberton | 15/348 |
| 5,641,339 | 6/1997 | Johnson | 55/428 |
| 5,669,741 | 9/1997 | Ono et al. | 406/173 |
| 5,800,578 | 9/1998 | Johnson | 55/337 |
| 5,957,299 | 9/1999 | Keuschnigg et al. | 209/137 |

Primary Examiner—Duane S. Smith
Attorney, Agent, or Firm—Andrus, Sceales, Starke & Sawall

[57] ABSTRACT

An apparatus for separating solids, such as scrap material, from a gas such as an air stream. The apparatus includes a horizontally mounted outer cylinder or drum and an inner perforated cylindrical member is mounted concentrically within the drum to provide an annular space therebetween. High velocity air containing scrap material is delivered through one or more tangential inlets to the annular space and the heavy scrap material is thrown outwardly by centrifugal force along the inner surface of the drum and discharged through a tangential outlet, while the air passes inwardly through the perforated member and is discharged through an axial outlet in the drum. The scrap material being discharged from the separator is fed to the lower end of a closed, inclined auger and conveyed upwardly and discharged into a surge tube of a baler where the scrap is converted into bales.

17 Claims, 2 Drawing Sheets

APPARATUS FOR SEPARATING SOLIDS FROM A GAS

BACKGROUND OF THE INVENTION

Pneumatic conveyors are used extensively in industry to convey scrap material from converting equipment and deliver the scrap to a baler, or other discharge site. In a typical paper converting operation, the scrap material may consist of small slivers of paper, paperboard or corrugated medium, or can take the form of relatively large pieces. In a typical pneumatic conveying system the scrap material is drawn into an inlet duct of the system by the operation of a blower and is discharged to a cyclone which acts to separate the solid material from the air stream. The typical cyclone is mounted vertically and is a relatively tall structure, with the inlet being located adjacent the top of the cyclone, while the separated solid material or scrap is discharged from the lower end. In the typical system, the scrap is discharged from the lower end of the cyclone to a baler where the scrap is then compacted into bales. The conventional baler requires a certain surge capacity so that the lower end of the cyclone is normally mounted a substantial distance above the baler and is connected to the baler through a surge tube.

Due to the height of the cyclone and the requirement for surge capacity for the baler, it is customary to mount the cyclone on the roof of the building or factory. However, mounting the cyclone on the roof of the building has certain disadvantages. First, the installation of the cyclone on the roof is not aesthetically pleasing, and the cyclone being on the roof is difficult to service particularly in inclement weather. Further, many factory roofs include a waterproof membrane and the installation of the cyclone and the accompanying ducts require openings in the membrane which have to be sealed. Further, workmen walking on the roof to install and service the cyclone and its equipment can cause punctures in the membrane.

Because of this, there has been a distinct need for a pneumatic conveying system which has a lesser overall height and can be totally located within a building or factory.

SUMMARY OF THE INVENTION

The invention is directed to an improved apparatus for separating solid material, such as scrap from paper, metal, or plastic converting operations, from a gas such as an air stream in a pneumatic conveying system.

The apparatus of the invention includes a separator having a horizontally mounted, non-rotating drum and a perforated cylinder is mounted coaxially within the drum to provide an annular space therebetween. Air, having the scrap material entrained therein, is delivered under pressure through one or more tangential inlets to the annular space in the separator. The heavier scrap material will be thrown outwardly by centrifugal force along the smooth inner surface of the drum, and is discharged through a tangential outlet into a tapered hopper, while the air flows radially inward through the perforated member, and is discharged from the drum through an axial outlet.

As a feature of the invention, the scrap material discharged from the separator is fed to the lower end of a closed inclined auger and the scrap is conveyed upwardly by the auger and discharged from the upper end of the auger into a surge tube that is connected to a conventional baler. The baler serves to compact and tie the scrap material into bales.

In a preferred form of the invention, a blower is connected to the air outlet of the separator, and the air stream containing entrained dust particles is drawn into the inlet of the blower and discharged to a conventional dust filter, where the dust is separated from the air. The blower tends to create a reduced pressure in the separator which counteracts the positive pressure of the air stream being fed to the separator, so that the scrap material being discharged from the separator will be at approximately atmospheric pressure, thus preventing air containing dust or fines from being discharged at high velocity from the baler to the atmosphere.

The invention employs a non-impact separator, in which the scrap material rides against the smooth inner surface of the drum. As the scrap material can have various shapes and sizes with jagged edges, and can take the form of relatively hard materials, such as metal or plastic, these materials will ride freely along the smooth surface of the drum. This construction has distinct advantages over the use of a screen-type in a separator, where the jagged edges of the scrap material could tend to plug up the screen and cause excessive wear of the equipment.

The use of the inclined auger provides a dual function, in that it not only serves to elevate the scrap to a height to increase the baler surge capacity, but can also serve as an air lock to prevent the escape of high velocity air containing dust or fines to the atmosphere.

As the separator is preferably mounted horizontally, the overall height of the pneumatic conveying system is reduced, which lends itself to under-roof installation, thus eliminating the need for roof mounting of equipment.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 1:
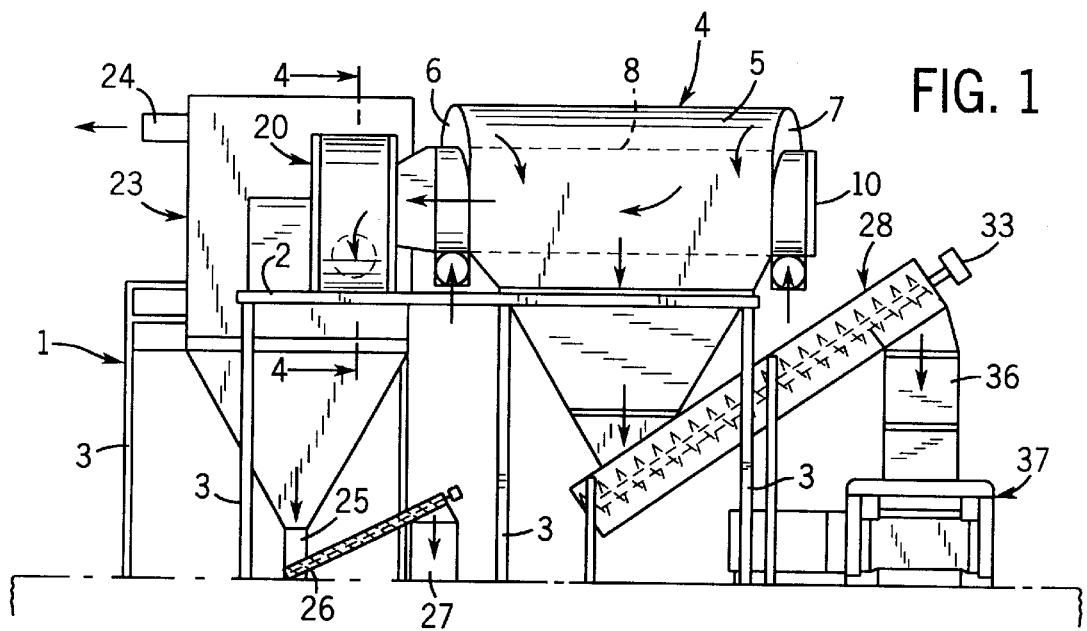
FIG. 1 is a schematic representation of the apparatus of the invention.

FIG. 1 illustrates an air-solid separating mechanism having particular use in a pneumatic conveying system The pneumatic conveying system can be used to convey scrap material from converting operations, such as paper, metal or plastic converting. In practice, the scrap material may take various shapes and sizes ranging from small slivers of material to large pieces that can be up to twelve inches or more in dimension.

The apparatus includes a structural frame 1, including a horizontal platform 2 that is mounted on a series of vertical legs 3. Mounted on platform 2 is an air-solid separator 4 that includes an outer generally cylindrical drum 5, the ends of which are enclosed by annular heads 6 and 7.

Located concentrically within drum 5 is a perforated member or cylinder 8, and the member 8 is spaced inwardly of drum 5 to provide an annular space 9 therebetween. The cylindrical member 8, in practice, may include a plurality of openings or perforations of about ⅜ inch diameter resulting in the cylinder being about 50% open. The ends of the perforated member 8 project outwardly through heads 6 and 7 of drum 5, and one end of the member 8 is enclosed by a cap 10.

Air having the scrap material entrained therein is delivered under pressure to the separator through one or more tangential inlet tubes 12. As shown in the drawings, two inlet tubes 12 are utilized, although any number of inlet tubes can be used depending upon the size of the conveying system. An air duct 13 is connected to each inlet tube 12 and the air is delivered through the duct 13 to the inlet tubes by a conventional blower, not shown, mounted in each duct 13.

A hinged flap or damper 15, which serves as a check valve, is mounted at the entry of each inlet tube 18 and functions to permit the flow of air into the separator 4, but prevents flow in the opposite direction. The damper 15 has particular use when the separator 4 has more than one inlet tube 12, and if air is not being supplied to the separator through one of the inlet tubes, the damper at that inlet tube will prevent flow of air back into the conveying system.

The scrap material in the air stream entering the separator 4 through inlets 13 will be thrown outwardly by centrifugal force and will ride against a smooth inner surface of the drum 5, and will be discharged tangentially through the lower outlet into the discharge outlet or hopper 16, while the air will move radially inward through the perforated member 8, and will be discharged from member 8 through outlet duct 17.

Figure 3:
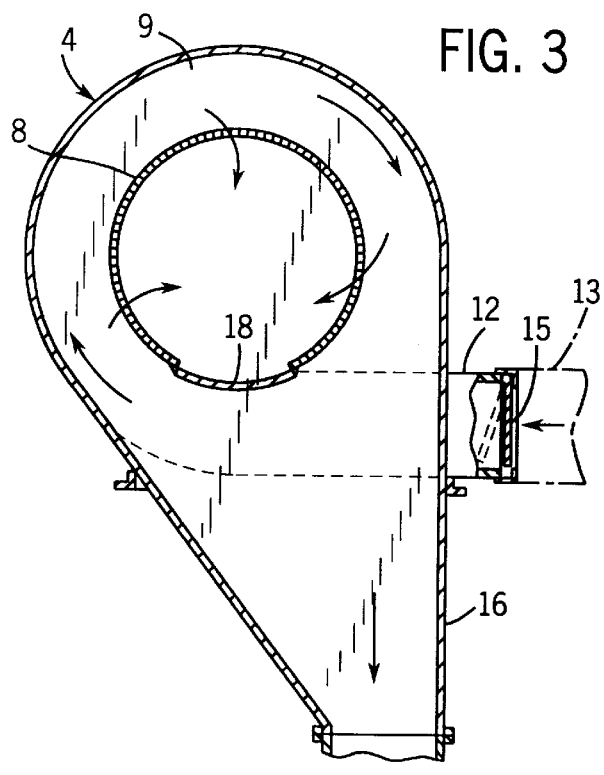
FIG. 3 is a section taken along line 3—3 of FIG. 2.

As best shown in FIG. 3, an arcuate portion 18 of the cylindrical member 8 extending through an arc of about 600 from the junction with the inlet tubes 13 is non-perforated or solid. By maintaining this arcuate section 18 free of perforations or openings, turbulence within the separator is minimized.

Figure 4:
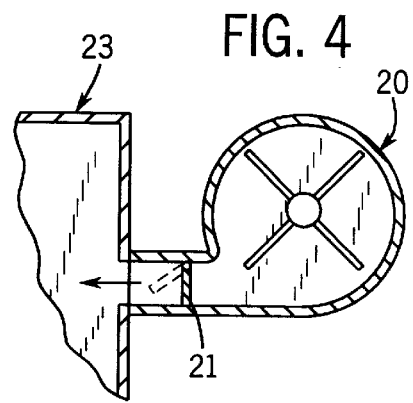
FIG. 4 is a section taken along line 4—4 of FIG. 1.

Outlet duct 17 is connected to the central inlet 19 of blower 20, and the outlet of blower 20 is connected through a duct 22 to the upper end of a conventional dust filter 23, as seen in FIG. 4. A conventional hinged damper 21 is connected in the outlet of blower 20. Dust filter 23 contains a fabric bag or filter which serves to filter dust from the air stream. The air is discharged from dust filter 23 through an outlet 24 in the upper end of the filter, while the collected dust is discharged from the lower end of the filter through duct 25. The collected dust can then be conveyed by an auger 26 to a drum 27, or other collection site.

As a feature of the invention, an inclined auger 28 is employed to convey the scrap material from separator 4 to baling equipment. Auger 28 includes a closed, generally cylindrical tube 29 and auger shaft 30 is mounted for rotation in tube 29 and carries a spiral flight 32. A conventional drive mechanism 33 is located outwardly of the end of the auger tube 29 and is operably connected to shaft 30.

The lower end of the inclined auger tube 29 is formed with an opening 34 that communicates with the lower end of hopper 16, and the end of upper tube 29 is provided with an opening that communicates with a vertical duct 36 that is generally rectangular in cross section. The lower end of duct 36 is connected to a conventional baler 37.

With this construction, the scrap material in hopper 16 will be conveyed upwardly through the auger tube 29 by spiral flight 32, and is discharged into duct 36 for delivery to the baler 37. The baler 37 requires a rain surge capacity, and as duct 36 has a substantial length, this provides the surge capacity that is required for the baler.

In addition to serving to convey the scrap material to the baler, the auger can also serve as an air lock if the pressure in hopper 16 is above atmospheric. By functioning as an air lock, the auger will prevent the discharge of pressurized air containing dust or fines into the atmosphere.

Baler 37 is a conventional type and in itself forms no part of the present invention. In baler 37 the scrap material is compressed and bound into bales in a typical manner.

Figure 2:
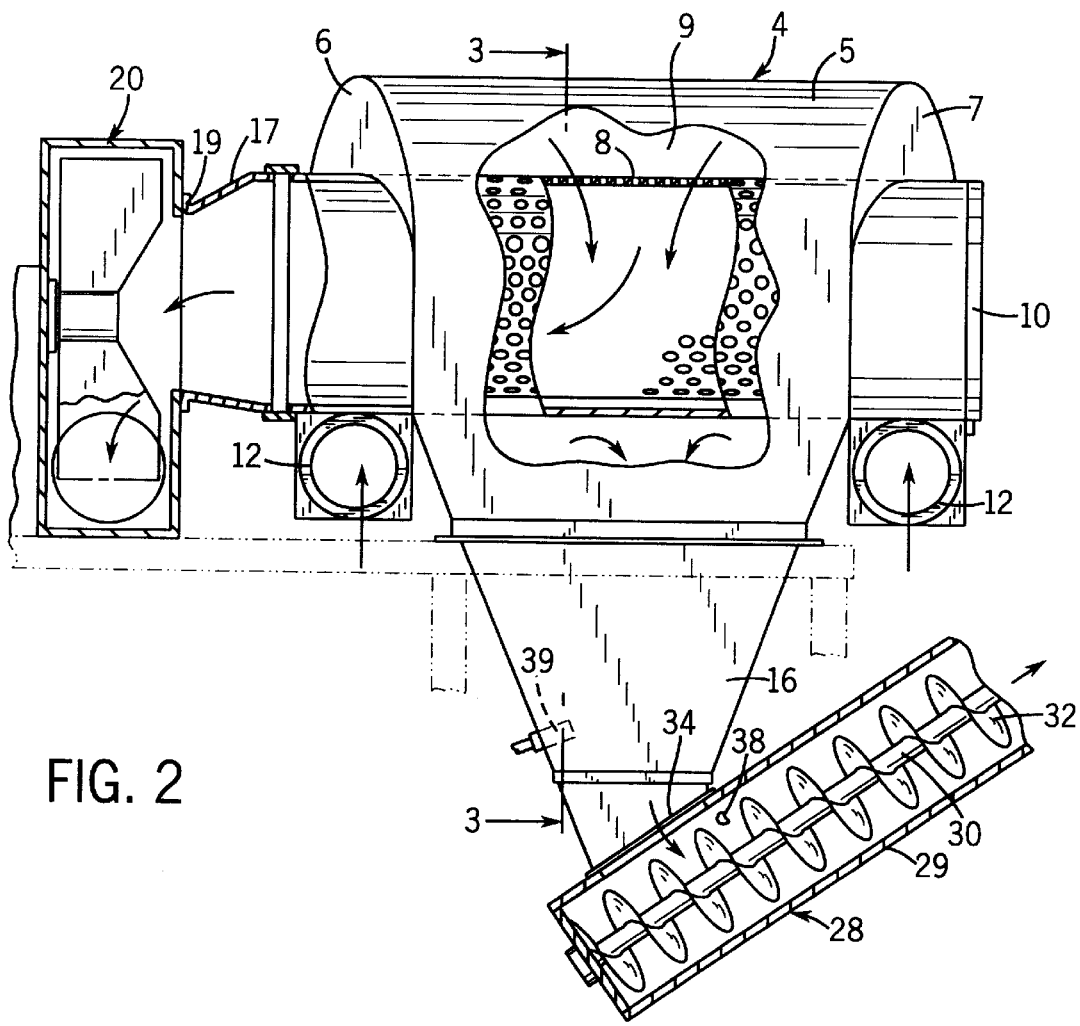
FIG. 2 is an enlarged side elevation of the separator with parts broken away in section.

As a further feature of the invention, a sensing mechanism can be employed to control the operation of auger 28. In this regard, a pair of photoelectric eyes 38 can be mounted across the upper portion of the lower end of inclined auger tube 29, as shown in FIG. 2. If the auger tube is filled with scrap material the light beam between eyes 38 will be broken and thereby initiate operation of the auger drive 33. On the other hand, if the auger tube is not filled with scrap material, the photoelectric beam will not be broken and the auger drive will not be operated. This ensures that the auger tube will be full of scrap material when operated to maintain the air lock characteristics of the auger.

As a further feature of the invention, a pressure sensor 39 can be incorporated in the hopper or outlet 16 of the separator and employed to control the capacity of blower 20. The pressure sensor 39 can be operably connected to a motor or other drive for the blower damper 21, and if the pressure in the hopper 16 varies from a pre-selected value, the position of damper 21 can be varied to thereby maintain the desire pressure in the hopper. Alternately, blower 20 can be a variable speed type and pressure sensor 39 can be operably connected to the blower.

Blower 20 tends to create a reduced pressure in separator 4 which counteracts the positive pressure of the air being introduced to the separator through inlets 12. The pressure sensing mechanism controls blower operation so that the scrap material being discharged from outlet 16 will be at approximately atmospheric pressure so that any residual dust or fines in the scrap will not be discharged at high velocity from baler 37. With this type of pressure control, it is not necessary that auger 28 provide an air lock. Thus, the air lock characteristics of auger 28 are more important in a system in which there is no variable control of blower 20.

Figure 5:
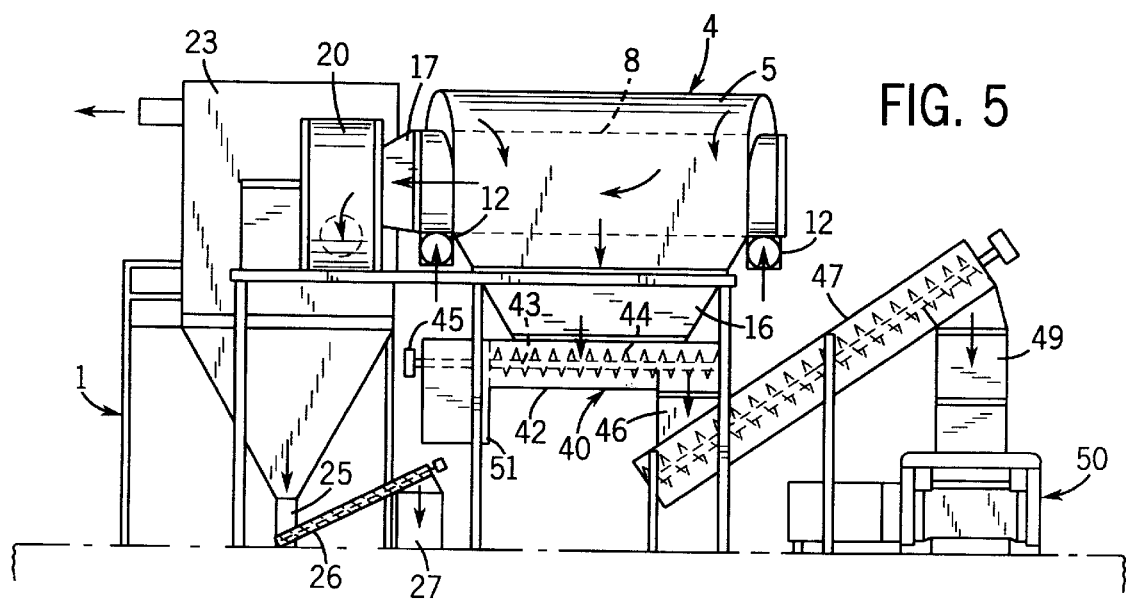
FIG. 5 is a schematic representation of a modified form of the invention.

FIG. 5 illustrates a modified form of the invention. In this embodiment, the separator 4, blower 20, and dust filter 23 are the same as described with respect to the first embodiment. However, in this embodiment, the outlet hopper 16 of separator 4 is connected to the central portion of a reversible auger 40. Auger 40 includes a generally cylindrical auger tube 42, and a shaft 43 is mounted for rotation within tube 42 and carries a spiral flight 44. A conventional reversible drive mechanism 45 is connected to one end of shaft 43 and serves to rotate flight 44 to convey scrap material. One end of tube 42 is provided with a discharge opening which is connected through a vertical duct 46 to the lower end of an inclined auger conveyor 47, which is similar in construction and operation to auger 28 of the first embodiment. As previously described, the scrap material being conveyed by the auger 47 is discharged through a vertical duct 49 to baler 50, which corresponds to baler 37, as previously described.

The opposite end of auger tube 42 is formed with a discharge opening that communicates with vertical duct 51. In normal operation of the system, the scrap material being discharged from separator 4 into auger 40 will be conveyed and discharged through duct 46 to the inclined conveyor 47 and hence to the baler 50. If the baler is shut down for some reason and cannot operate, auger 40 can be reversed, which will cause the scrap material to be conveyed through auger tube 42 and discharged through outlet 51 to the atmosphere. Thus, even if operation of the baler 50 is shut down, the separator 4 can continue to operate with the scrap material being discharged through the outlet 51.

Separator 4 provides a non-impact type of separation, in which the scrap material, which can take the form of irregularly shaped and jagged pieces, rides along the smooth inner surface of drum 5. Thus, the flow of the scrap material will not be impeded as could occur if the scrap material travels along a perforated surface, such as a screen.

Auger 28 serves a dual function, in that it not only elevates the scrap material to provide increased surge capacity for baler 37, but also can function as an air lock to prevent escape of pressurized air containing dust or fines from the system.

With the use of the inclined conveyor, along with the horizontally mounted separator, the overall height of the system is considerably reduced over conventional pneumatic conveying systems, thus enabling the separating equipment to be mounted beneath the roof of a factory, or other facility.

Various alternatives and embodiments are contemplated as being within the scope of the following claims particularly pointing out and distinctly claiming the subject matter regarded as the invention.

I claim:

1. A gas-solid separator, comprising an outer generally cylindrical drum, a generally cylindrical perforated member spaced inwardly from the drum to provide an annular space therebetween, inlet means for introducing a gas under pressure and containing entrained solid material to said space, first outlet means for discharging a solid material tangentially from said space, second outlet means communicating with the interior of said perforated member for discharging the gas from said drum, blower means having an inlet communicating with said second outlet means and having a discharge outlet, dust removing means connected to said discharge outlet for removing dust from said gas, an inclined auger having an auger inlet connected to said first outlet means and having an auger outlet, said solid material passing through said first outlet means to the auger inlet, drive means for driving said auger to convey the solid material upwardly in the auger and discharge the solid material through said auger outlet, sensing means for sensing the presence of solid material in the auger, said sensing means being operably connected to said drive means to drive the auger when solid material is present in said auger, and baling means communicating with said auger outlet for forming said solid material into bales.

2. The separator of claim 1, wherein said inlet means and said first outlet means both extend tangentially of said drum.

3. The separator of claim 2, wherein said second outlet means extends axially of said inner perforated member.

4. The separator of claim 1, wherein said auger includes an outer generally cylindrical tube having an upper end and a lower end and a helical flight mounted for rotation within said tube, said auger inlet is disposed on the upper surface of the lower end of the tube.

5. The separator of claim 4, wherein the auger outlet is located in a lower surface of the upper end of said tube.

6. The separator of claim 1, wherein said baling means is spaced beneath said auger outlet, and said separator includes a generally vertical tubular member connecting the auger outlet with said baling means.

7. The separator of claim 4, wherein said auger tube is closed and provides an air lock to prevent air from being discharged from said auger.

8. An apparatus for separating scrap material from air, comprising an outer drum having a smooth generally cylindrical inner surface, an inner member spaced radially inward of said drum to provide an annular space therebetween, said inner member having a plurality of perforations to permit the flow of air therethrough, a pair of inlets, each inlet communicating with said annular space and extending tangentially of said drum for introducing an air stream containing entrained scrap material to said space, an air outlet communicating with an axial end of said inner member for discharging air, a scrap outlet communicating with said space and extending tangentially of the drum for discharging scrap material from the drum, and pressure means for flowing air under pressure and containing said scrap material into said inlet.

9. The apparatus of claim 8, and including an inlet tube extending inwardly from each inlet and connected to said inner member, said inlet tube having a discharge end for discharging air into said space.

10. The apparatus of claim 9, wherein a portion of said inner member extending arcuately in the direction of air flow from the junction of said inlet tube and said inner member is free of said perforations.

11. The apparatus of claim 10, wherein said portion extends through an arc of about 60°.

12. An apparatus for separating scrap material from air, comprising an outer generally cylindrical drum, a generally cylindrical perforated inner member disposed inwardly of said drum to provide an annular space therebetween, inlet means for introducing air containing entrained scrap material into said annular space, first outlet means communicating with said annular space for discharging the scrap material from said space, second outlet means communicating with the interior of said inner member for discharging air from said member, first conveying means communicating with said first outlet means, said first conveying means being reversible to convey said scrap material in a first direction to a first outlet and in a second direction to a second outlet, second inclined conveying means having a low end and an upper end, said first outlet of said first conveying means communicating with the low end of said second conveying means, baling means for baling said scrap material, a generally vertical duct connecting the upper end of said second conveying means with said baling means for delivering scrap material to said baling means, and discharge outlet means connected to the second outlet of said first conveying means, operation of said first conveying means in said first direction acting to convey said scrap material to said second conveying means and then to said baling means and operation of said first conveying means in said second direction acting to convey said scrap material through said discharge outlet means.

13. The apparatus of claim 8, wherein said scrap outlet is located between said pair of inlets.

14. The apparatus of claim 8, and including damper means operably disposed in each inlet to individually open and close each inlet.

15. An apparatus for separating scrap material from air, comprising an outer drum having a smooth generally cylindrical inner surface free of perforations, an inner member spaced inwardly of said drum to provide an annular space therebetween, said inner member having a plurality of openings to permit the flow of air therethrough, said drum having an inlet communicating with said annular space, pressure means for flowing air under pressure and containing scrap material into said inlet, an air outlet communicating with an axial end of said inner member for discharging air, a scrap outlet communicating with said space and extending generally tangentially of the drum for discharging scrap material from the drum, and means connected to said air outlet for creating a negative pressure in said drum to thereby compensate for the positive pressure of the air entering the inlet and provide a substantially neutral pressure at said scrap outlet.

16. The apparatus of claim 15, and including pressure sensing means disposed at said scrap outlet for sensing the pressure at said scrap outlet, said pressure sensing means being operably connected to said means for creating a negative pressure to maintain said substantially neutral pressure at said scrap outlet.

17. An apparatus for separating scrap material from a pressurized stream of air, comprising an outer drum having a smooth generally cylindrical inner surface, an inner member spaced radially of said drum to provide an annular space therebetween, said inner member having a plurality of openings to permit the flow of air therethrough, an inlet communicating with said annular space, pressure means for flowing air containing scrap material under pressure in said inlet, an air outlet communicating with an axial end of said inner member for discharging air, a scrap outlet communicating with said space for discharging scrap material from the drum, an inclined auger having an auger inlet connected to said scrap outlet and having an auger outlet, drive means for driving said auger to convey solid material upwardly in the auger and discharge the solid material through said auger outlet, sensing means for sensing the presence of solid material in the auger, said sensing means being operably connected to the auger to drive the auger when solid material is present in the auger, and means communicating with said auger outlet for forming said solid material into a compacted mass.

* * * * *